Jan. 15, 1963  M. A. ROBERTI  3,074,001
MAGNETIC AMPLIFIER REGULATOR FOR A MOTOR GENERATOR SYSTEM
Filed Oct. 22, 1954
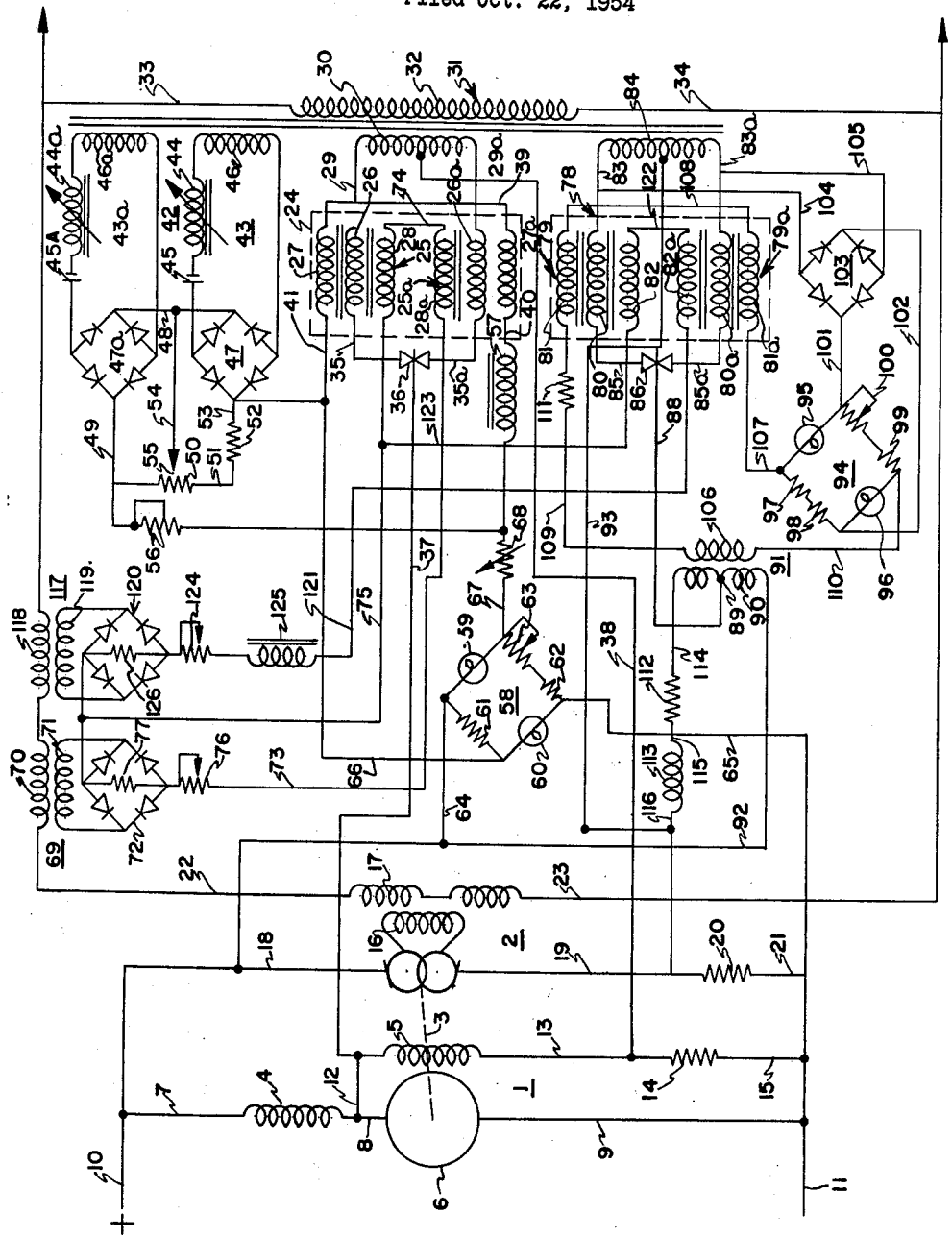
INVENTOR.
MICHAEL A. ROBERTI
BY
ATTORNEY United States Patent Office 3,074,001
Patented Jan. 15, 1963

3,074,001
MAGNETIC AMPLIFIER REGULATOR FOR A MOTOR GENERATOR SYSTEM
Michael A. Roberti, Clark, N.J., assignor to The Bendix Corporation, a corporation of Delaware
Filed Oct. 22, 1954, Ser. No. 464,063
3 Claims. (Cl. 322—16)

The present invention relates to regulating systems and more particularly to regulating systems for dynamo-electric machines.

Heretofore, regulators of the variable resistance type have had wide spread usage for regulating output voltage and frequency of dynamoelectric machines. In some applications, for example in aircraft, the requirements are such that the variable resistance type of regulator is unsatisfactory. Further, there is the problem of maintenance where moving parts are involved.

The present invention provides a novel regulator utilizing static components in which a magnetic amplifier is controlled by variation from a predetermined condition in a direction to return the system to the predetermined condition. Further means are provided to induce a damping signal upon the magnetic amplifier to prevent oscillations or hunting.

It is an object of the invention to provide a novel static electrical regulator.

Another object of the invention is to provide a novel regulating system for a dynamoelectric machine utilizing static components.

Another object of the invention is to provide a novel voltage regulator.

Another object of the invention is to provide a novel frequency regulator.

Another object of the invention is to provide improved means for controlling the output voltage and frequency of an inverter.

The above and other objects and features of the invention will appear more fully hereinafter from a consideration of the following description taken in connection with the accompanying drawing wherein one embodiment of the invention is illustrated by way of example.

In the drawing:

The single FIGURE is a schematic diagram of an inverter embodying the invention.

Referring now to the drawing, a motor 1 is illustrated as driving a generator 2 through a shaft 3. The motor 1 may be of the type having a series winding 4, shunt winding 5 and armature 6. The winding 4 is connected in series with the armature 6 by conductors 7, 8 and 9 across input lines 10 and 11. The input lines 10 and 11 are connected to a suitable source of electrical energy (not shown). One end of the winding 5 is connected by conductor 12 to the conductor 8, while the other end of the winding 5 is connected by conductor 13 to one side of a resistor 14. The other side of the resistor 14 is connected by conductor 15 to the conductor 11. The resistor 14 is proportioned so that a minimum level of excitation is maintained in the shunt field 5.

The generator 2 is illustrated as having a rotating field winding 16 and a stator or output winding 17. While the generator 2 is illustrated as being single phase, it is understood that it could be multiphase as well. One end of the winding 16 is connected by conductor 18 and conventional slip-rings to the conductor 10. The other end of the winding is connected by conductor 19 to one side of a resistor 20 while the other side of the resistor 20 is connected by conductor 21 to the conductor 11. The resistor 20 is proportioned so that a minimum level of excitation is maintained in the field winding 16. One end of the winding 17 is connected to output conductor 22 while the other end of the winding 17 is connected to output conductor 23. The output conductors 22 and 23 are adapted to be connected to a suitable load (not shown).

A novel feature of the invention resides in the means for regulating the frequency and voltage of the system. Output frequency and voltage can be maintained substantially constant for input voltage variations, load changes, ambient temperature changes and for any combination of the aforenoted variations. Frequency regulation is obtained by controlling the energization of the winding 5 and thereby the speed of the motor 5 by means of a magnetic amplifier 24. The amplifier 24 comprises a pair of saturable reactors 25 and 25a, each having load windings 26 and 26a, control windings 27 and 27a, and compensating windings 28 and 28a. The reactances 25 and 25a may be of the type utilizing a toroid core. One end of the winding 26 of the reactor 25 is connected by conductor 29 to one side of a center tapped secondary winding 30 of a transformer 31 having a primary winding 32 connected by conductors 33 and 34 across the output lines 22 and 23. While the transformer 31 is illustrated as having multiple secondary windings, it is understood that individual transformers could be used. The other end of the winding 26 is connected by conductor 35 to one input terminal of a full wave center tapped rectifier 36.

One end of the winding 26a of the reactor 25a is connected by conductor 29a to the other side of the secondary winding 30 of the transformer 31. The other end of the winding 26a is connected by conductor 35a to the other input terminal of the rectifier 36. The output of the rectifier 36 is connected by conductor 37 to one side of the winding 5 of the motor 1. The other side of the winding 5 is connected by conductor 38 to the center tap of the secondary winding 30.

The control windings 27 and 27a are connected in series by conductor 39, conductor 40 and conductor 41 across the output of a frequency detector 42. The frequency detector 42 comprises two series tuned circuits 43 and 43a, one of which is tuned to resonance at a frequency above the operating frequency and the other tuned to resonance at a frequency below the operating frequency. The tuned circuit 43 includes inductance 44 and capacitor 45 connected in series with secondary winding 46 of the transformer 31 across the input of a full wave rectifier 47. The tuned circuit 43a includes inductances 44a and capacitor 45a connected in series with secondary winding 46a of the transformer 31 across the input of full wave rectifier 47a. A conductor 48 connects output terminals of one polarity of the rectifiers 47 and 47a together. The other terminals of the rectifiers 47 and 47a are connected together by conductor 49, resistor 50, conductor 51, resistor 52 and conductor 53. The conductor 48 is connected by conductor 54 to an adjustable tap 55 on the resistor 50. The output from the frequency detector 42 is connected to the control windings 27 and 27a as previously described by the conductors 40 and 41. A resistor 56 and inductance 57 may be inserted in the conductor 40. The resistor 56 increases the response time of the control circuit in order to maintain stability. The inductance 57 offers a high impedance to harmonics induced in the control windings.

Compensation for input voltage variations is obtained from an input voltage detector 58. The detector 58 comprises non-linear resistance elements 59 and 60 connected in opposite arms of a bridge circuit with resistors 61 and 62 forming the opposite arms. An adjustable resistor 63 is provided through the arm with the resistor 62. One input terminal of the detector 58 is connected by conductor 64 to the input line 10 and the other input terminal is connected by conductor 65 to the input line 11. The output of the detector 58 is connected by conductors 66 and 67 across the windings 27 and 27a. An adjustable resistor 68 may be inserted in the conductor 67 for adjusting the slope of the input voltage vs. signal output curve.

Load compensation is obtained by means of current transformer 69 having a primary winding 70 and secondary winding 71. The winding 69 is connected in series with the output line 22. A bridge rectifier 72 is connected across the secondary winding 71. The compensating windings 28 and 28a are connected in series across the output of the rectifier 72 by conductors 73, 74 and 75. A variable resistor 76 may be inserted in the conductor 73 for adjustment. A resistor 77 connected across the output of the rectifier 72 causes the output of the generator to vary directly with the generator output current.

Voltage regulation is obtained by controlling the energization of the winding 16 of the generator 2 and thereby the output voltage by means of a magnetic amplifier 78. The amplifier 78 comprises a pair of saturable reactors 79 and 79a, each having a load winding 80 and 80a, control winding 81 and 81a, and compensating winding 82 and 82a. The reactors 79 and 79a may be of the type utilizing a toroid core. One end of the winding 80 is connected by conductor 83 to one side of a center-tapped secondary winding 84 of the transformer 31. The other end of the winding 80 is connected by a conductor 85 to one input terminal of a center-tapped rectifier 86.

One end of the winding 80a of the reactor 79a is connected by a conductor 83a to the other side of the secondary winding 84 of the transformer 31. The other end of the winding 80a is connected by conductor 85a to the other input terminal of the rectifier 86. The output terminal of the rectifier 86 is connected by conductor 88 to a tap 89 on winding 90 of a stabilizing transformer 91. One end of the winding 90 is connected by conductor 92 to the conductor 18. The center tap of the winding 84 of transformer 31 is connected by conductor 93 to the conductor 19.

Variations in output voltage are sensed by a non-linear bridge detector 94 which has non-linear elements 95 and 96 connected in opposite arms of the bridge. The adjoining arms comprise resistor 97 and temperatures compensating resistor 98 in one arm and resistor 99 and variable resistor 100 in the other. The input terminals to the detector 94 are connected by conductors 101 and 102 across the output of rectifier 103. The input to the rectifier 103 is connected by conductors 104 and 105 across the secondary winding 84 of the transformer 34. The control windings 81 and 81a of the amplifier 79 are connected in series with winding 106 of the transformer across the output of the detector 94 by conductors 107, 108, 109 and 110. A resistor 111 may be inserted in the conductor 109.

A bias is provided for the transformer 91 in order to prevent it from operating in saturation by connecting a portion of the winding 90 in series with a resistor 112 and inductance 113 by conductors 114, 115 and 116 to the conductor 19. The inductance 113 provides a time delay of the bias current so that a maximum transfer of energy develops across the winding 106 for a given transient disturbance. Also the winding 106 offers a high impedance to harmonics induced in the control windings 81 and 81a.

Load compensation is obtained by means of current transformer 117 having a primary winding 118 and a secondary winding 119. The winding 118 is connected in series with the output line 22. A bridge rectifier 120 is connected across the secondary winding 119. The compensating windings 82 and 82a are connected in series across the output of the rectifier 120 by conductors 121, 122 and 123. A variable resistor 124 and an inductance 125 may be inserted in the conductor 121. The resistor 124 may be adjusted to obtain the desired signal for the compensating windings and the inductance 125 aids in maintaining voltage stability. A resistor 126 connected across the output of the rectifier 120 provides an output voltage from the rectifier 120 that varies directly with the load current.

In operation, the motor field 5 receives a minimum level of excitation through the resistor 14 connected in series therewith across the D.C. input. Additional excitation is obtained from the motor amplifier 24. The impedance of the load windings 26 and 26a is varied in accordance with the current flowing in the control and compensating windings. In the frequency detector 42, one of the tuned circuits is designed to resonate slightly above the operating frequency and the other to resonate slightly below the operating frequency. At the operating frequency, the frequency detector is adjusted to produce a null, positive or negative signal across the output as desired. The output is connected across the control windings 27 and 27a. A departure from the operating frequency will change the energization of the control windings 27 and 27a in a direction and amount proportional to the direction and amount of deviation from the operating frequency. The resistor 52 provides means for maintaining the motor speed constant for ambient temperature changes. It provides a load for the rectifier 47 which is proportional to the ambient temperature. Input voltage variations are detected by the input voltage detector 58 and superimpose a signal on the control windings 27 and 27a proportional to input voltage variations.

Load compensation is provided by energizing the compensating windings 25 and 25a in accordance with the current flowing in the output line 22 by means of a current transformer and rectifier.

Voltage regulation is obtained by varying the impedance of the load windings 80 and 80a of the voltage amplifier 78 in accordance with output voltage variations. A voltage detector 94 senses output voltage variations and energizes control windings 81 and 81a in a direction and magnitude depending upon the direction and magnitude of the voltage deviation. The impedance of the load windings is a function of the energization of the control windings.

Stability is obtained by means of a stabilizing winding having one winding connected in series with the generator field winding 17 and a secondary winding connected in series with the control windings. Transient voltages induced in the secondary winding provide a damping signal to the control windings.

Load compensation is obtained by energizing the compensating windings 82 and 82a in accordance with the current flowing in the output line 22 by means of a current transformer and rectifier.

Minimum excitation for the generator field winding 16 is obtained by connecting the resistor 20 in series with the winding 16 across the D.C. input.

Temperature compensation for the voltage detector is obtained by means of the resistor 99 which has a positive temperature coefficient thereby enabling the output signal to vary with ambient temperature changes such that the generator voltage remains substantially constant regardless of ambient temperature.

Although only one embodiment of the invention has been illustrated and described, various changes in the form and relative arrangements of the parts may be made to suit requirements.

What is claimed is:

1. A regulating system for a motor generator system including a direct current motor driving an alternating current generator, said motor having a control winding and said generator having an excitation winding and an output circuit, said regulating system comprising means for supplying a minimum level of excitation for said motor control winding, means for supplying a minimum level of excitation for said generator excitation winding, means responsive to a condition of said output circuit for supplying additional excitation in accordance with said output condition, to control the speed of said motor, said means including a magnetic amplifier having a load winding energized from the output of said generator, a control winding energized in accordance with frequency changes in said generator output to affect said load winding in a direction depending upon the direction of said frequency changes, a compensating winding energized in accordance with the load current in said generator output to affect said load winding in accordance with said load current, and means including a detector for detecting variations in output voltage to maintain said output voltage as a predetermined value.

2. A regulating system for a motor generator system including a direct current motor driving an alternating current generator, said motor having a control winding and said generator having an excitation winding and an output circuit, said regulating system comprising means including a source of direct current for providing a predetermined amount of excitation for said control winding and said excitation winding, means including a saturable reactance energized from said output circuit for providing a control excitation for said control winding in accordance with a condition of said output circuit, and means including a second saturable reactance energized from said output circuit for providing a control excitation for said excitation winding in accordance with another condition of said output circuit.

3. The combination as set forth in claim 2 and including means for affecting said saturable reactances in accordance with load changes in said output circuit.

References Cited in the file of this patent

UNITED STATES PATENTS

| | | |
|---|---|---|
| 2,356,397 | Grabau | Aug. 22, 1944 |
| 2,558,572 | Logan | June 26, 1951 |
| 2,584,856 | FitzGerald | Feb. 5, 1952 |
| 2,610,315 | McKendry et al. | Sept. 9, 1952 |
| 2,773,232 | Herbst et al. | Dec. 4, 1956 |
| 2,797,382 | Woerdemann | June 25, 1957 |